United States Patent [19]

Iwanaga

[11] Patent Number: 5,058,694
[45] Date of Patent: Oct. 22, 1991

[54] RESERVOIR TANK SUPPORT STRUCTURE

[75] Inventor: Yoshihisa Iwanaga, Kariya, Japan

[73] Assignee: Kabushiki Kaisha Toyoda Jidoshokki Seisakusho, Kariya, Japan

[21] Appl. No.: 526,309

[22] Filed: May 21, 1990

[30] Foreign Application Priority Data

May 22, 1989 [JP] Japan .................................. 1-58976

[51] Int. Cl.$^5$ ............................................. B62D 25/10
[52] U.S. Cl. .................................... 180/90; 180/69.24
[58] Field of Search ............................. 180/90, 69.24; 248/289.1, 289.3, 313

[56] References Cited

U.S. PATENT DOCUMENTS 2,202,277   5/1940   Visser ..................................... 180/90

FOREIGN PATENT DOCUMENTS 57-3067    1/1982   Japan .
57-45468   3/1982   Japan .
57-47562   3/1982   Japan .
1158972    7/1969   United Kingdom ................. 180/90

Primary Examiner—Kenneth R. Rice
Assistant Examiner—M. Shaughnessy
Attorney, Agent, or Firm—Brooks Haidt Haffner & Delahunty

[57] ABSTRACT

A reservoir tank is disposed in a housing between a front protector and a front panel removably mounted to the front protector, by a support device. The support device supports the reservoir tank in such a way that the position of the tank can be adjusted. When the front panel is removed and the reservoir tank is moved towards the front of the forklift, the operation of adding brake fluid can be carried out with ease as there are no obstacles above the reservoir tank.

5 Claims, 6 Drawing Sheets

RESERVOIR TANK SUPPORT STRUCTURE

BACKGROUND OF THE INVENTION

1. Field of the Invention

The present invention relates to a structure for supporting a reservoir tank for storing brake fluid and the like which can be used in a forklift.

2. Description of the Prior Art

Forklifts are normally provided with a reservoir tank for storing brake fluid that is to be supplied to the brake master cylinder.

Conventionally, as shown in FIG. 1 and 2, the reservoir tank 1 is mounted to a plate 7 welded to a front protector 5 arranged between headguard front pillars 3. As clearly shown in FIG. 2, this reservoir tank 1 is comprised of a cup-shaped body 9, a cover 11 and a brake fluid outlet or nozzle 13, the nozzle 13 being connected to a brake master cylinder (not shown) through a reservoir hose 15. The tank 1 is fixed through a tank cradle 17 to a plate 7 by bolts 19. Further, an upper plate 21 is arranged above the tank 1 as a front pad to cover electrical components, etc. that may be mounted to the front protector 5.

The reasons the tank 1 is mounted in a relatively narrow space in this fashion are, (1) to protect the tank 1 from dust and rain, (2) to keep it from interfering with the steering post 25 in which the shaft of the steering wheel 23 is inserted and, (3) to keep it from interfering with the leg of an operator when operating the brake pedal 27.

However, with the above configuration it is extremely difficult to add brake fluid to the tank 1 because it is in a comparatively remote position in front of and below the driver's seat. Although when adding fluid the operations of removing the cover 11, adding the fluid, replacing the cover 11, etc., must be carried out, such operations are impeded by the steering post 25, front protector 5 and/or the upper plate 21. Also, as the tank 1 is exposed to the outside, the protection from rain and dust is not sufficient.

SUMMARY OF THE INVENTION

Accordingly, the object of the present invention is to provide a structure for supporting a reservoir tank that can facilitate the operations involved in adding brake fluid.

Another object of the present invention is to provide a structure for supporting a reservoir tank that can protect the tank from rain and dust and maintain the brake fluid in a clean condition.

In order to achieve the above and other objects the structure for supporting a reservoir tank of the present invention comprises a front protector disposed in front of a driver's seat, a front panel removably mounted to a front surface of the front protector to define a housing for the reservoir tank between the front protector and the front panel, a support bracket located in the housing and secured on the front surface of the front protector, and a tank plate for supporting the reservoir tank, mounted to the support bracket for movement between a retracted position adjacent to the front protector and a projected position away from the protector.

With this construction the front panel is removed and the tank plate mounting the tank reservoir can be moved towards the front of the vehicle. In this way, the operation of adding brake fluid can be carried out with extreme ease as there are no obstacles above the reservoir tank if the tank is moved out to the forward projected position. Further, the tank plate is normally in the retracted position and the front panel is mounted to the front protector, the reservoir tank being substantially surrounded by the front panel and front protector, to thereby be protected from rain, dust, etc.

These and other objects and features of the present invention will become apparent from the following detailed explanation in conjunction with the attached drawings.

BRIEF DESCRIPTION OF THE DRAWINGS

In the course of the following detailed description, reference will be made to the attached drawings in which.

DESCRIPTION OF THE PREFERRED EMBODIMENT

Figure 1:
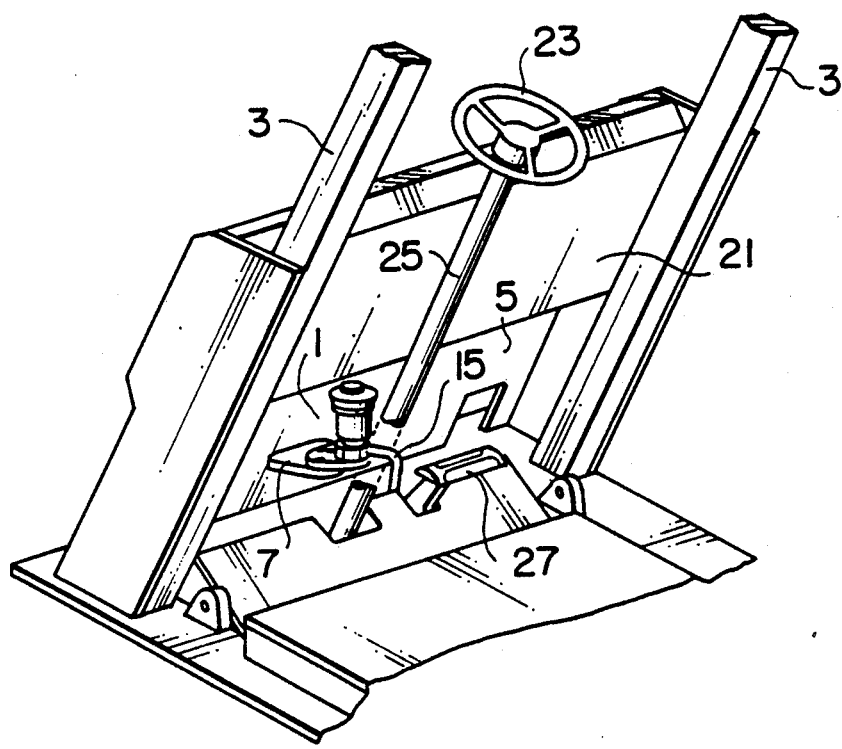
FIG. 1 is a perspective view of a conventional reservoir tank support structure for a forklift.
Figure 2:
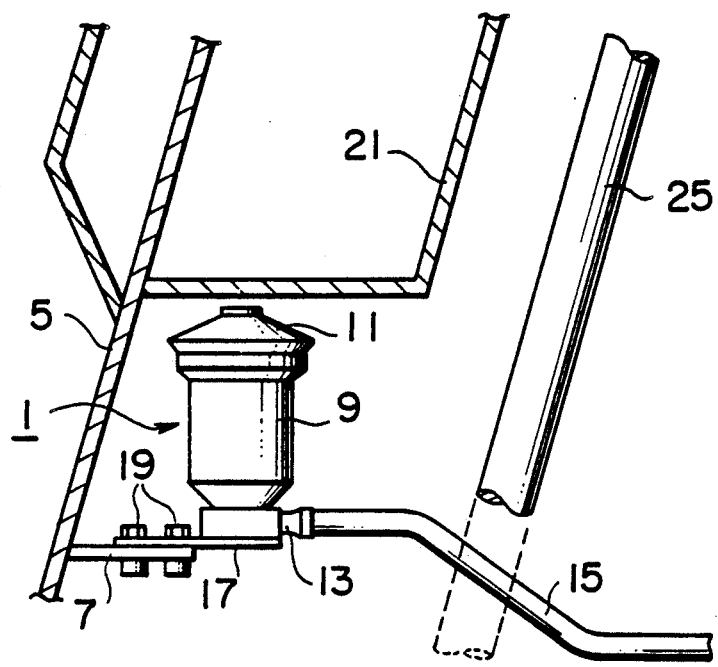
FIG. 2 is a sectional view of the reservoir tank support structure of FIG. 1.
Figure 3:
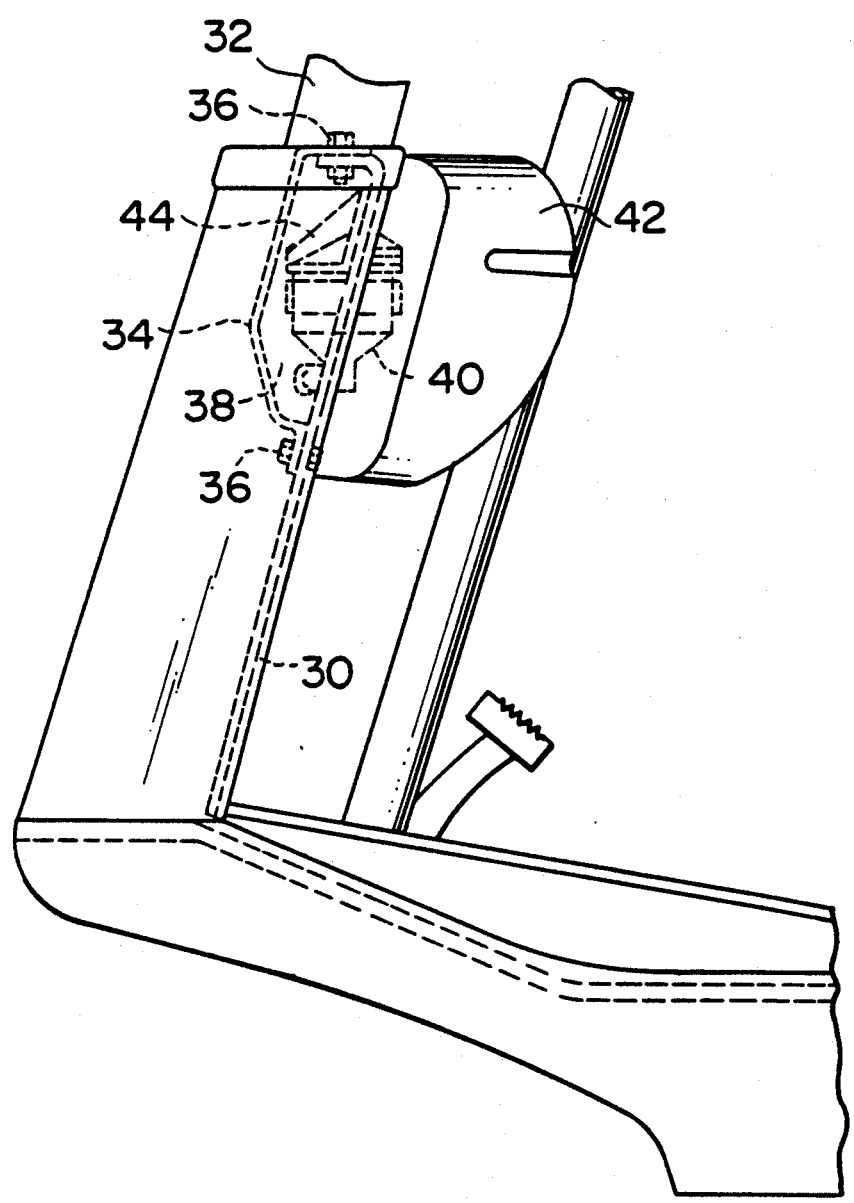
FIG. 3 is a side view of a reservoir tank support structure of the present invention.
Figure 4:
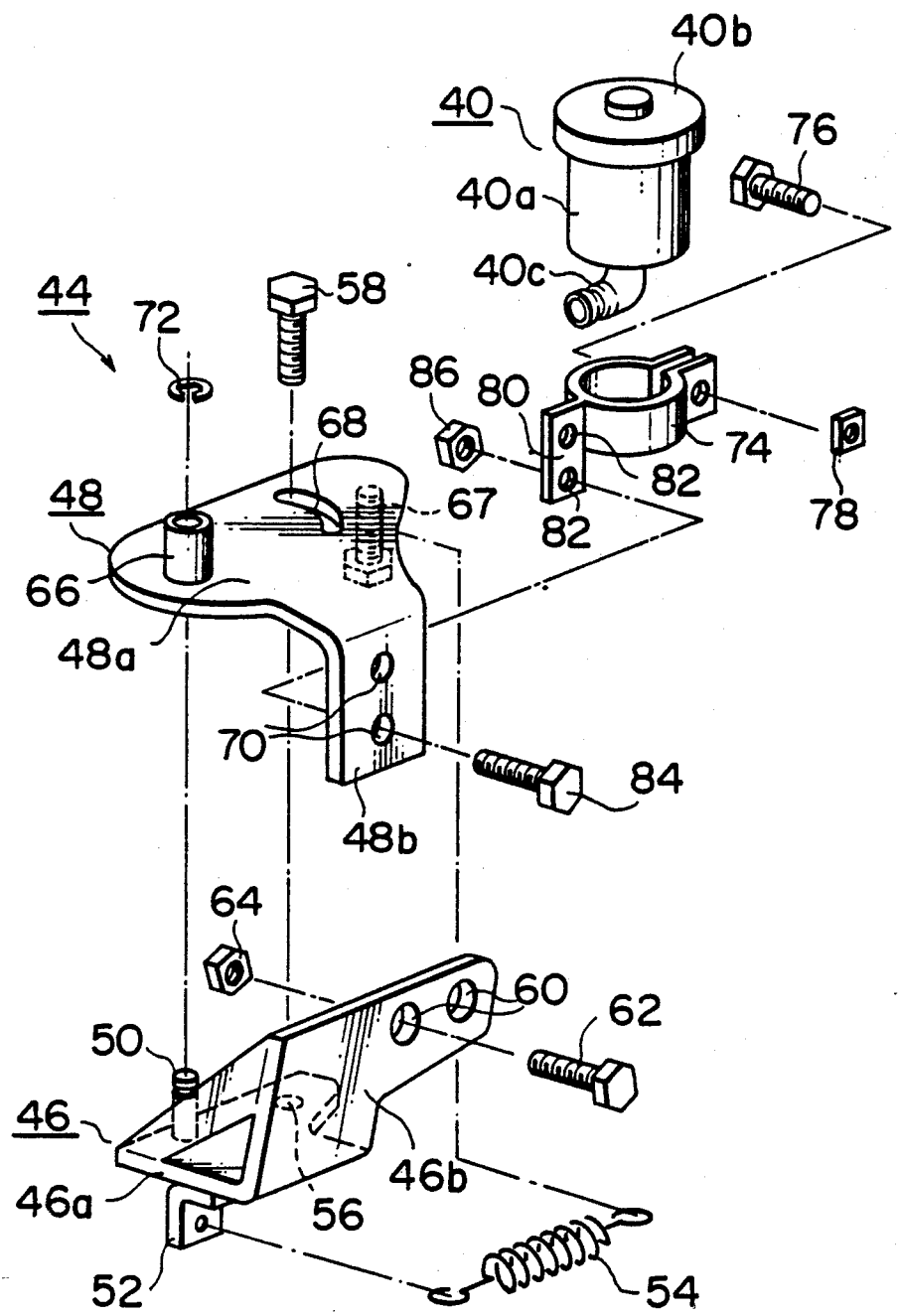
FIG. 4 is an exploded perspective view of one embodiment of a tank support device utilizing the support structure of FIG. 3.
Figure 5:
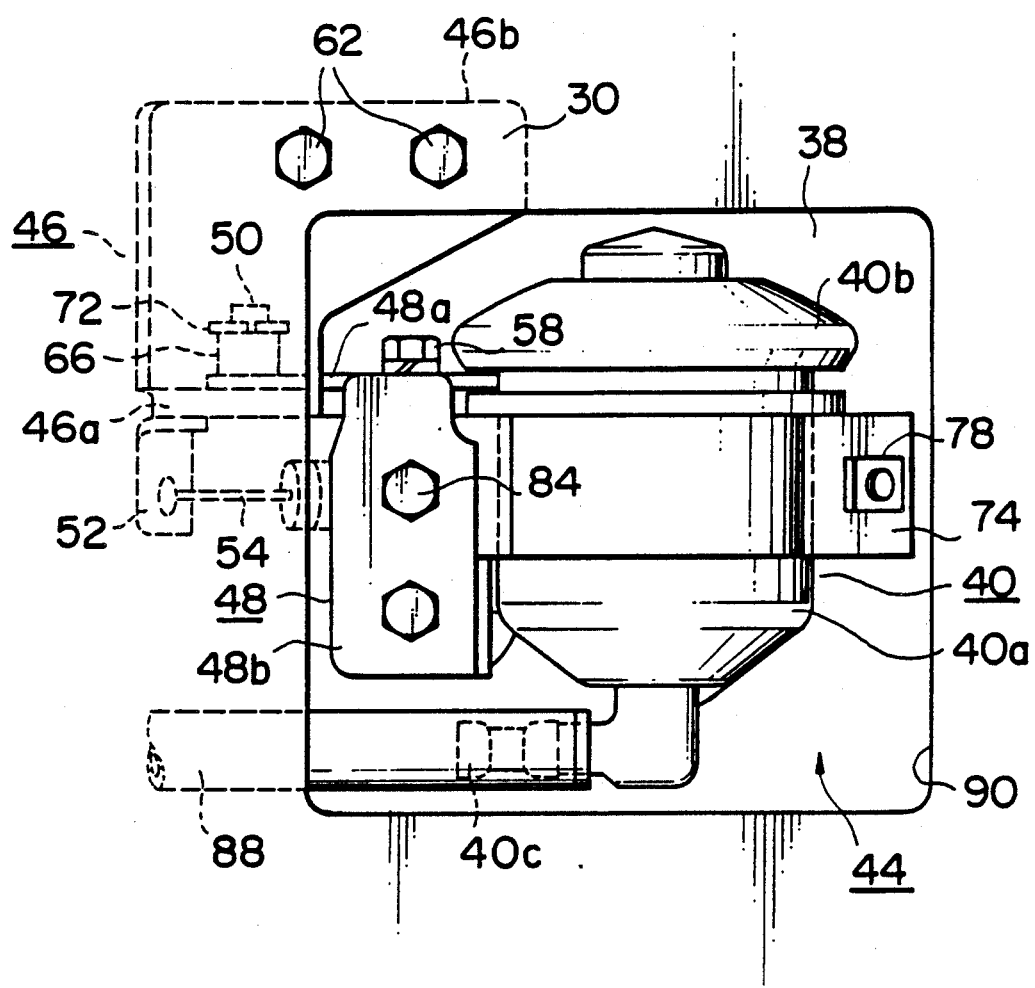
FIG. 5 is a view of the tank support device of FIG. 4 as seen from the driver's seat.
Figure 6:
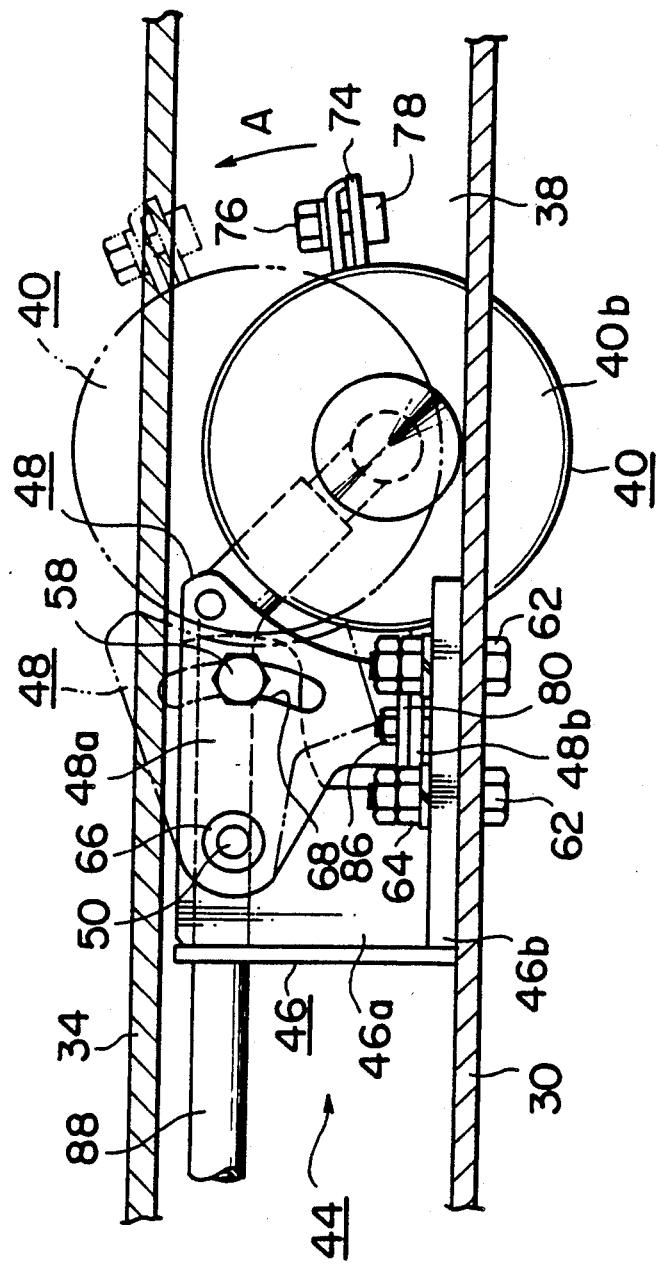
FIG. 6 is a plan view of the tank support device of FIG. 4.

Here, reference should be made to the drawings, particularly to FIG. 3, wherein the reservoir tank support structure of the present invention is shown. A front protector 30 is mounted to between the front pillars 32 of the head guard forward of the driver's seat of a forklift, and a front panel 34 is removably mounted by bolts 36 to a front upper surface of the front protector 30. Therefore, a space is defined by the front protector 30 and the front panel 34, this space being utilized as a housing 38 for the reservoir tank 40. Also, a front pad 42 is mounted at a rear upper surface of the front protector 30, this front pad 42 covering the tank 40 projecting from the front protector 30 as will be described below. The reservoir tank 40 for holding brake fluid to be supplied to a brake master cylinder (not shown) is disposed within this housing 38, and is supported by a reservoir tank supporting device 44 as shown in FIGS. 4 to 6.

This tank supporting device 44 mainly comprises a support bracket 46 mountable to a front upper surface of front protector 30, and a tank plate 48 rotatably supported to support bracket 46 and able to mount a tank 40.

Support bracket 46 is of a generally L-shape and comprises a horizontal portion 46a and a vertical portion 46b extending upwardly. A support spindle 50 for rotatably supporting the tank plate 48 is mounted at an upper surface of the horizontal portion 46a and a hook 52 for hooking one end of a coil spring 54 is mounted to a lower surface of the horizontal portion 46a. The horizontal portion 46a also has a threaded hole 56 for threaded engagement with a guide bolt 58 that is for guiding tank plate 48. The vertical portion 46b has a pair of bolt holes 60 that match with bolt holes in the front protector 30. As shown in FIGS. 5 and 6, the support bracket 46 is fixed to the front protector 30 by nuts 64 tightened on bolts 62 that pass through these bolt holes 60.

Tank plate 48 is comprised of a horizontal portion 48a and a vertical portion 48b. A bushing 66 into which the support spindle 50 of support bracket 46 is inserted is mounted in an upper surface of horizontal portion 48a through a hole in horizontal portion 48a, and a bolt 67 is mounted in a lower surface thereof for hooking the other end of coil spring 54. Horizontal portion 48a also has an arc shaped guide slot 68 for passing through guide bolt 58 mounted to support bracket 46. Bolt holes 70 for mounting tank 40 are provided in vertical portion 48b.

As seen in FIGS. 4 to 6, tank plate 48 is rotatably supported to support bracket 46 by nesting bushing 66 of tank plate 48 on the support spindle 50 of support bracket 46 fixed to front protector 30 and engaging a snap ring 72 into a groove around the periphery of the top end of spindle 50. The guide bolt 58 is next passed through the guide slot 68 of tank plate 48 and threaded into the threaded portion of threaded hole 56 of support bracket 46. When the guide bolt 58 is tightly threaded into the threaded hole 56, the tank plate 48 is fixed to the support bracket 46. If the guide bolt 58 is loosened, the tank plate 48 can be rotated within the range of the guide slot 68, between the retracted position (position represented by solid lines in FIG. 6) and the projected position (position represented by broken lines in FIG. 6). The coil spring 54 is mounted between the bolt 67 extending down from support plate 48 and hook 52 of support plate 46, this spring 54 acting to pull the tank plate 48 to the rear of the vehicle when the tank plate is in a retracted position and to rotate the tank plate 48 towards the front of the vehicle when it is in a projected position.

The reservoir tank 40 is comprised of a cup shaped body 40a, a cover 40b and a nozzle 40c. As shown in FIGS. 4 to 6, a ring bracket 74 is wrapped around the cup shaped body 40a, the end of the bracket 74 being clamped by a bolt 76 and a nut 78 to fix the body 40a to the ring bracket 74. Ring bracket 74 has a mounting plate 80, the mounting plate 80 having bolt holes 82 that match the bolt holes 70 in the vertical portion 48a of the tank plate 48. Accordingly, the ring bracket 74, and in turn the tank 40, can be fixed to the tank plate 48 by nuts 86 threaded onto bolts 84 passed through these bolt holes 70 and 82. A reservoir hose 88 to the master cylinder (not shown) is connected to nozzle 40c.

As described above, the tank plate 48 affixing the tank 40 is normally pulled towards the front protector 30 by the coil spring 54, and fixed there by the guide bolt 58. In this condition, although the tank 40 is disposed within the housing 38 between the front protector 30 and the front panel 34, due to space limitations the rear portion of the tank 40 protrudes from a rectangular opening 90 arranged in the front protector 30. This protruding portion of tank 40 is covered by a front pad 42 as shown in FIG. 3. Further, a window may preferably be provided in a portion of front panel 34 facing tank 40 to allow confirmation of brake fluid level in the tank 40.

When carrying out an operation to add brake fluid, the front panel 34 is first removed. Next, the guide bolt 58 is loosened to release the fixed condition of tank plate 48 and support bracket 46. However, guide bolt 58 should not be removed from threaded hole 56 of support bracket 46 at this time. The tank plate 48 is then rotated forward (arrow A in FIG. 6) around the support spindle 50 until reaching the projecting position where guide bolt 58 touches the rear end of guide slot 68. During this rotation, the coil spring 54 between the support bracket 46 and the tank plate 48 passes its dead point to urge the tank plate 48 forward, and maintains it in the projecting position. Accordingly, there is nothing that will get in the way above the tank 40, and the removal of the cover 40b, the addition of brake fluid and replacement of the cover 40b can be easily carried out. When the tank plate 48 is subsequently pushed back against the force of spring 54, the tank plate 48 will be pulled rearwards as soon as the coil spring 54 passes dead center again, the tank plate automatically returning to its retracted position. The guide bolt 58 is then tightened in threaded hole 56 of support bracket 46 to fix tank bracket 48. Finally, by mounting the front panel 34 to the front protector 30, the tank 40 is again disposed within the housing 38 where it is essentially unaffected by rain, dust, etc.

Figure 7:
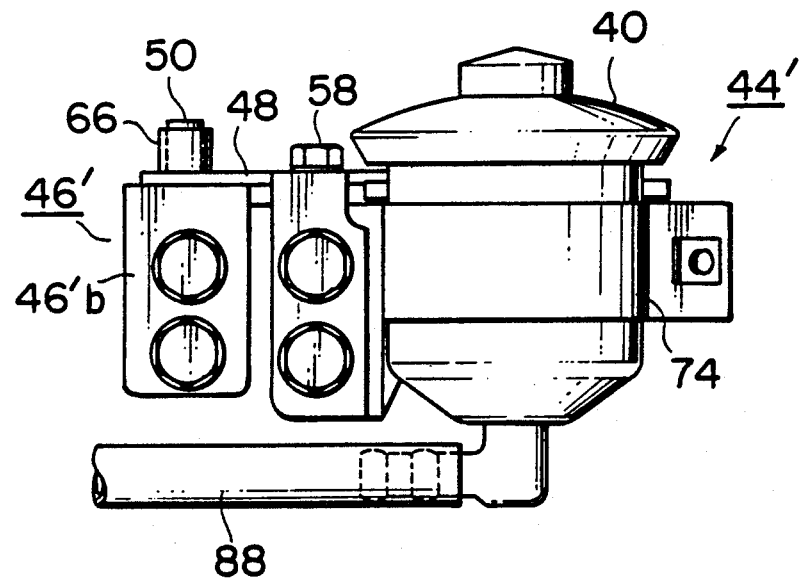
FIG. 7 is an elevational view of a second embodiment of the tank support device of the present invention.
Figure 8:
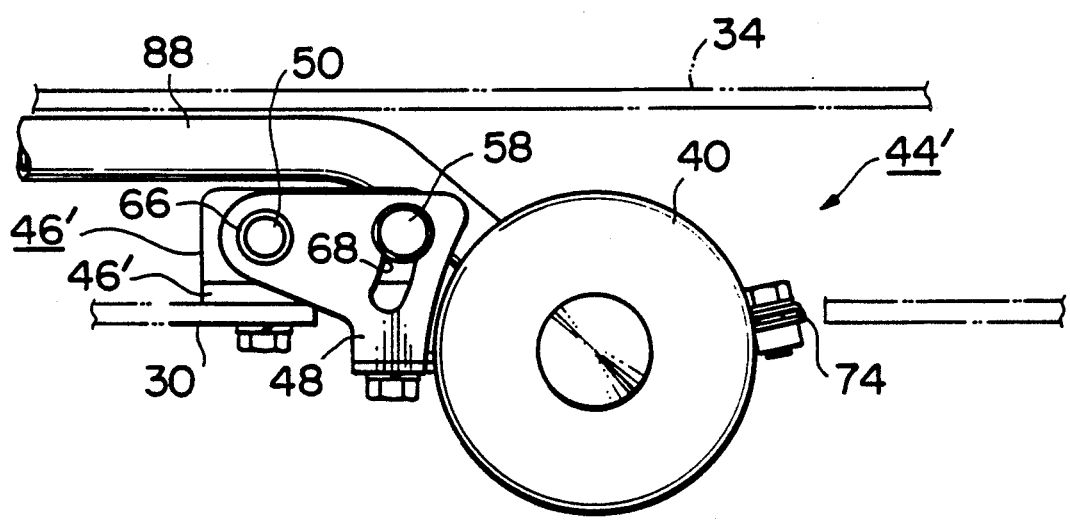
FIG. 8 is a plan view of the tank support device of FIG. 7.

FIGS. 7 and 8 show another embodiment of the reservoir tank support device of the present invention. This support device 44' differs from the first embodiment in that the vertical portion 46b' of support bracket 46' extends downwardly and in that there is no coil spring between support bracket 46' and tank plate 48. In this case, if the guide bolt 58 of tank plate 48 is not tightened, the tank plate can move, but it is advantageous in that the construction is simple. In other aspects this embodiment is essentially the same as the first embodiment and similar portions are labelled with the same reference numerals and explanation thereof being dispensed with for brevity.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. A structure in a forklift for supporting a reservoir tank for brake fluid, comprising:
    a front protector disposed in front of a driver's seat;
    a front panel removably mounted on a front surface of said front protector to define a housing for the reservoir tank between said front protector and said front panel;
    a support bracket located in said housing and secured on the front surface of said front protector, said support bracket having a vertical support spindle mounted thereon; and
    a tank plate for supporting the reservoir tank, said tank plate being mounted on said vertical support spindle on said support bracket for horizontal pivotal movement between a retracted position adjacent to said front surface of said front protector and a projected position away from said front surface towards and beyond said front panel.

2. The reservoir tank support structure of claim 1, including releasable means for securing said tank plate at its said retracted position.

3. The reservoir tank support structure of claim 1, which further comprises horizontal spring means mounted between said support bracket and said tank plate at a location on the latter to maintain said tank plate in each of its said retracted position and its said projected position.

4. A device for supporting a reservoir tank for brake fluid on a body of a forklift including:
   a support bracket mounted on the forklift body; and
   a tank plate for supporting the reservoir tank, said tank plate being mounted on said support bracket for horizontal pivotal movement.

5. The reservoir tank support device of claim 4, including releasable means for securing said tank plate at a desired position.

* * * * *